United States Patent [19]
Tanida

[11] Patent Number: 5,876,868
[45] Date of Patent: Mar. 2, 1999

[54] BATTERY SEALING STRUCTURE

[75] Inventor: Katsumi Tanida, Tokyo, Japan

[73] Assignee: Hohsen Corp., Hannan, Japan

[21] Appl. No.: 845,476

[22] Filed: Apr. 25, 1997

[51] Int. Cl.[6] .................................................. H01M 2/12
[52] U.S. Cl. .............................. 429/56; 429/7; 429/163; 429/174
[58] Field of Search .................................. 429/53, 54, 56, 429/171, 172, 174, 177, 163, 164, 7, 8, 62

[56] References Cited

U.S. PATENT DOCUMENTS

| | | | |
|---|---|---|---|
| 4,271,241 | 6/1981 | Hooke et al. | 429/54 |
| 5,376,467 | 12/1994 | Abe et al. | 429/7 |
| 5,427,875 | 6/1995 | Yamamoto et al. | 429/53 X |
| 5,455,128 | 10/1995 | Tanaka | 429/53 X |
| 5,677,076 | 10/1997 | Sato | 429/56 |
| 5,702,840 | 12/1997 | Byon | 429/53 X |

*Primary Examiner*—Anthony Skapars
*Attorney, Agent, or Firm*—Wenderoth, Lind & Ponack, L.L.P.

[57] ABSTRACT

A battery sealing structure is provided, which can provide an excellent seal for a battery. The sealing structure has an explosion-proof function and contributes to improved battery assembling operation efficiency. A three-part stack, including a cap member (3), a PTC element (4) and a safety valve (5), is inserted in a gasket (8). The safety valve has the same outer diameter as the cap member (3) and has a breakable portions capable of being broken in the event of an increase of pressure in the battery. The gasket (8), made of a soft synthetic resin, is inserted in a battery housing (2). The stack is set on an upper surface of a stepped portion (8a) of the gasket such that its outer edge is in close contact with the inner periphery of the gasket. A peripheral wall portion of the battery housing (2) adjacent the opening thereof is bent together with the gasket toward the center of the battery and onto an edge portion of the upper surface of the cap member (3) and is then pressed against the same while pushing a portion of the peripheral wall (2b) of the battery housing where the edges of the cap member (3) and the safety valve (5) are located.

10 Claims, 4 Drawing Sheets

BATTERY SEALING STRUCTURE

BACKGROUND OF THE INVENTION

1. Field of the Invention

This invention relates to a battery sealing structure with an explosion-proof function of preventing-battery explosion due to an abnormal increase of the inner pressure in the battery and, more particularly, to a battery sealing structure, which is capable of excellently sealing the battery and can contribute to improvements in battery assembling operation efficiency.

2. Prior Art

Recently, small-size portable electronic devices such as cellular phones, portable note personal computers, video cameras, etc. have remarkably spread. These devices extensively use small-size, high capacity lithium ion secondary batteries.

When such a lithium ion secondary battery is short-circuited or overcharged due to causes such as a trouble in the apparatus in which the battery is used or an erroneous use thereof, the temperature is increased, and also gas may be generated in the battery to increase the pressure in the battery. To prevent excessive current in the battery, a safety valve having an explosion-proof function and PTC (Positive Temperature Coefficient) element with the resistance thereof having a positive temperature coefficient are provided in the battery.

The safety valve and the PTC element are accommodated together with a cap member which serves as an external electrode terminal of the battery, and a stripper member which is deformed to cut current between the safety valve and a lead as a result of an increase of the inner pressure in the battery, in a substantially cylindrical seal member which seals the accommodated components while insulting the components from the battery housing. The accommodated components are engaged with one another in an overlapped fashion in the seal member. In this state, they are set in an opening of the battery housing, and caulked by a press means to seal the battery.

In the above prior art battery sealing structure, however, it is very difficult to completely seal the overlapped metal portion of the cap member, PTC element and safety valve. In the lithium ion secondary battery, therefore, the electrolyte may leak out under severe conditions. Accordingly, in the prior art battery, seal rubber coating is used to seal overlapped metal portions of the cap member, the PTC element and the safety valve.

However, the operations of providing the seal rubber coating over the overlapped metal portions of the cap member, PTC element and safety valve, are unsuitable for a flow operation. Besides, the components are engaged together less tightly and are more readily separable from one another in correspondence to the thickness of the seal rubber coating. This is undesirable for robots and parts feeders which are needed for mass production by a consistent flow operation.

SUMMARY OF THE INVENTION

An object of the invention is to realize a battery sealing structure, which can excellently seal a battery with an explosion-proof function and contribute to improvements in battery assembling operation efficiency.

DETAILED DESCRIPTION OF THE PREFERRED EMBODIMENTS

Figure 1:
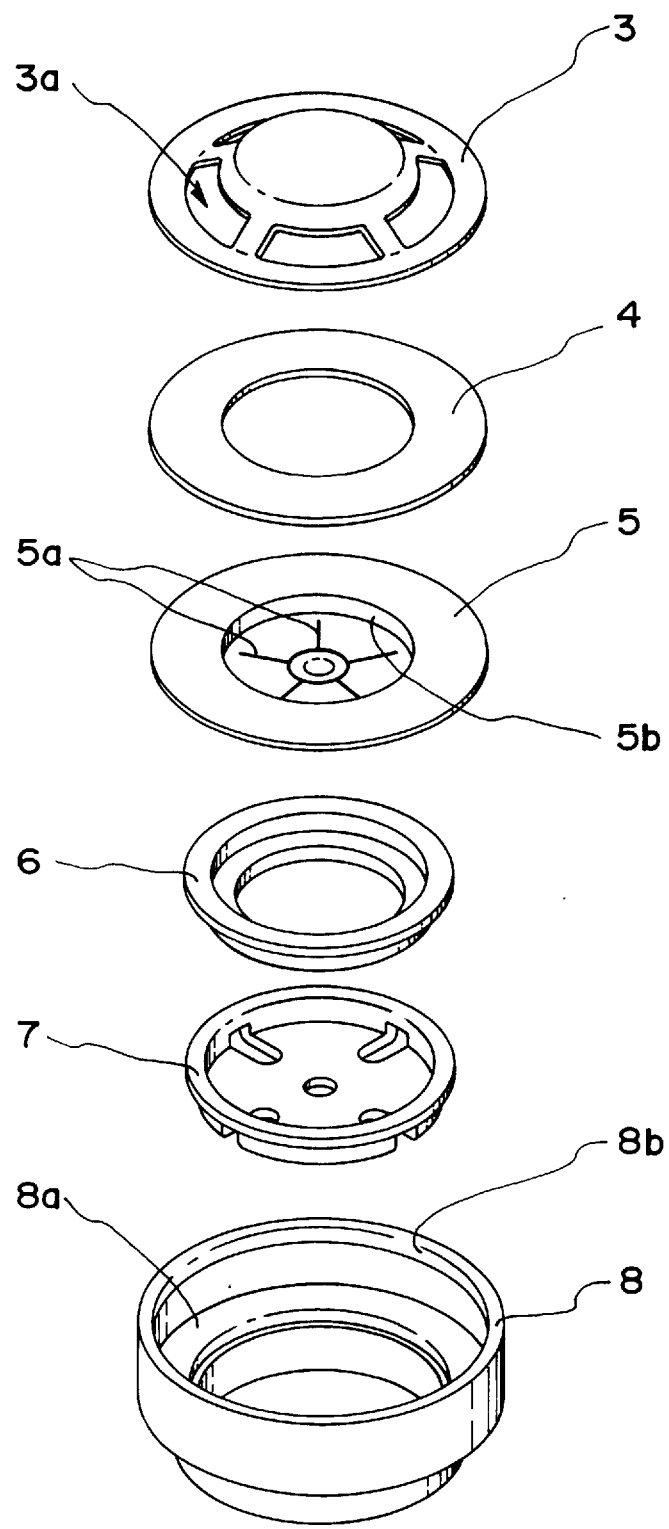
FIG. 1 is an exploded perspective view showing a battery sealing structure according to the invention.
Figure 2:
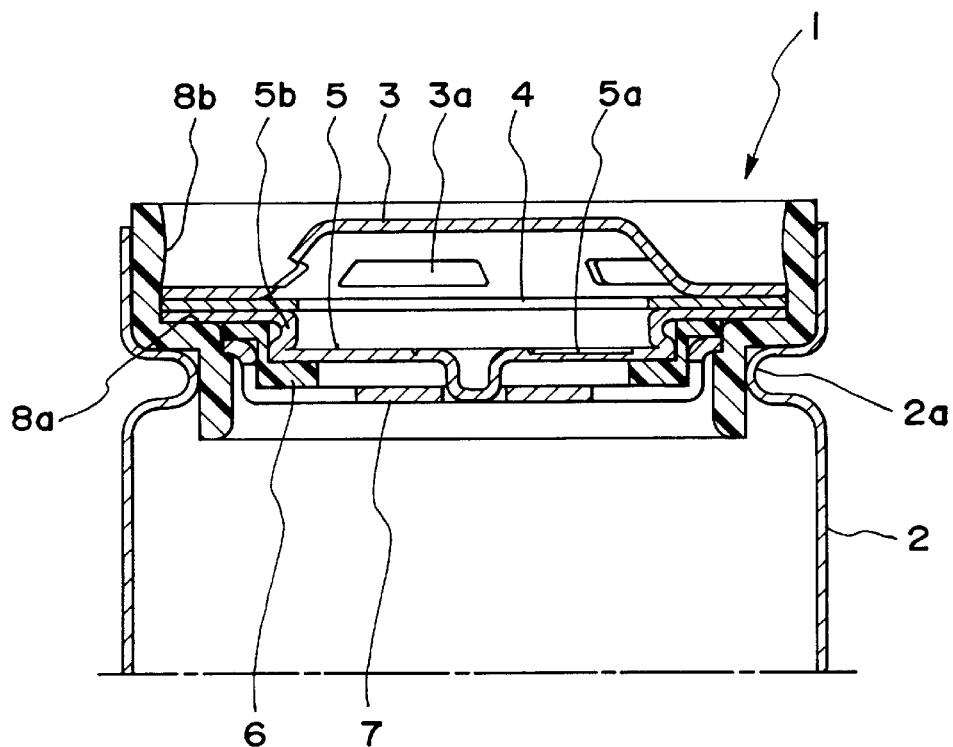
FIG. 2 is a sectional view showing the battery sealing structure according to the invention before caulking.
Figure 3:
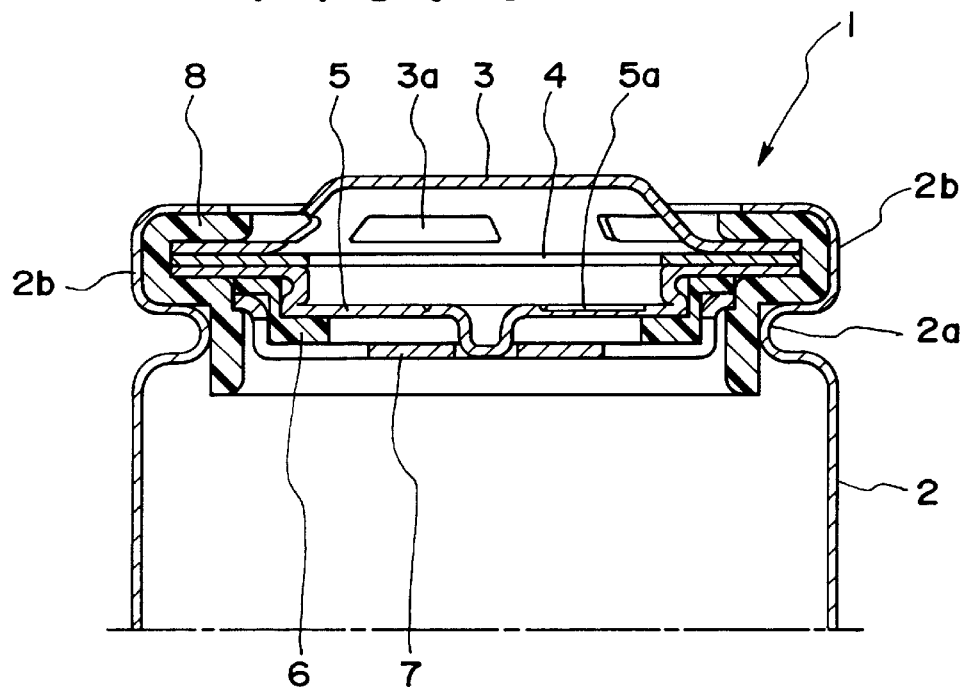
FIG. 3 is a sectional view showing the battery sealing structure according to the invention after caulking.
Figure 4:
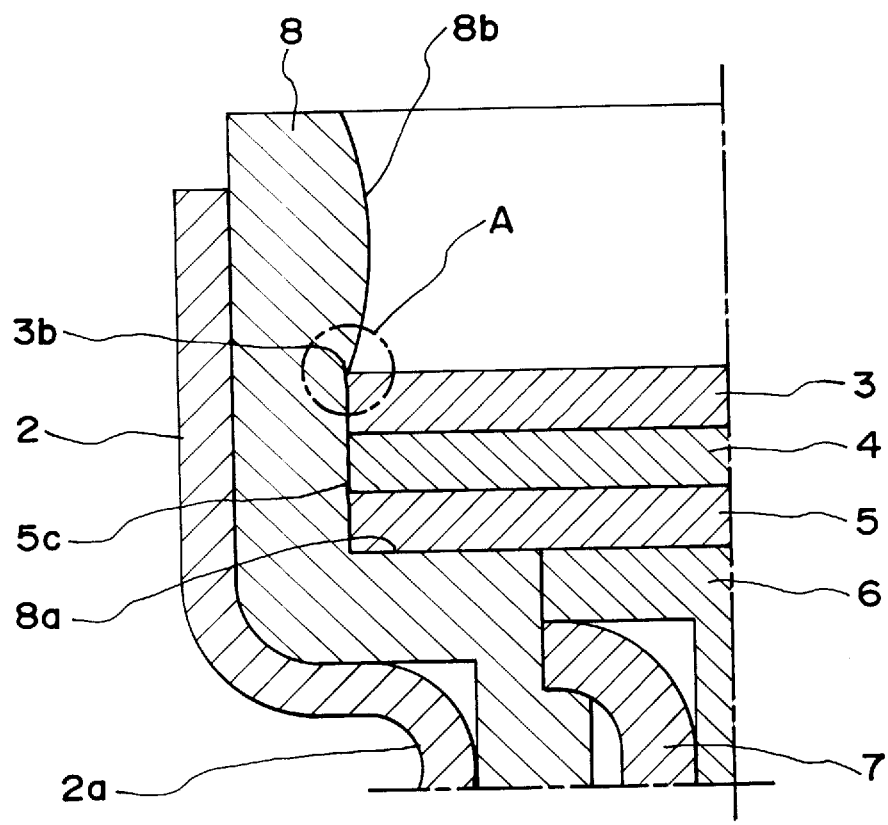
FIG. 4 is a fragmentary sectional view showing the battery sealing structure according to the invention.

FIGS. 1 to 3 show a battery sealing structure according to the invention. Reference numeral 1 designates the battery according to the invention. Reference numeral 2 designates a battery housing having a cylindrical shape with a bottom and a neck 2a with a reduced inner diameter underneath a top opening. Reference numeral 3 designates a cap member which serves as an external electrode terminal on the outer periphery of the battery 1. Reference numeral 4 designates a thin ring-like PTC element with the resistance thereof having a positive temperature coefficient. Reference numeral 5 designates a substantially disc-like safety valve having breakable portion 5a which is called a rupture and has a concentric stepped portion 5b. Reference numeral 6 designates a substantially ring-like insulating member which is fitted on the stepped portion 5b of the safety valve 5. Reference numeral 7 designates a stripper member which is disposed such that it is in contact with a lead of a power-generating element of the battery 1 and, with an increase of the pressure in the battery, is deformed to break the lead and thus cut off current between the safety valve 5 and the lead. Reference numeral 8 designates a substantially cylindrical gasket, which is made of an insulating soft synthetic resin, such as polypropylene, polytetrafluoroethylene, etc. and has a stepped portion 8a to be hooked on the neck 2a of the battery housing 2.

The cap member 3 has five openings 3a, the total area of which is greater than in the prior art structure. Thus, in the event that the pressure in the battery increases such that an explosion may result, the cap member 3 can reduce the violence of spouting gas and minimize the damage.

The construction of the battery 1 according to the invention will now be described in the order in which it is of its assembled. The insulating member 6 which electrically insulates the safety valve 5 and the stripper member 7 from each other, is engaged in close contact with the stepped portion 5b of the safety valve 5, and the stripper member 7 is engaged in close contact with the insulating member 6. In this state, the safety valve 5, the insulating member 6 and the stripper member 7 are engaged in close contact with one another and cannot be readily disassembled, so that they can be loaded as assembling parts in a parts feeder. The PTC element 4 and the cap member 3 are then overlapped over the safety valve 5, and the cap member 3, the PTC element 4, the safety valve 5, the insulating member 6 and the stripper member 7 are set as assembling parts on the top surface of the stepped portion 8a such that they are in close contact with the inner periphery of the gasket 8. As shown in FIG. 2, the gasket 8 with the assembling parts engaged therein is then inserted in the battery housing 2 through the opening thereof, and its stepped portion 8a is hooked on the neck 2a of the battery housing 2. In this state, the assembling parts are spaced apart by minimum clearances necessary for the engagement, and are thus in a very close state of engagement. The inner periphery of the gasket 8 has a protuberance 8b adjacent to the top opening, making it difficult for the once engaged assembling parts to be detached.

Figure 5:
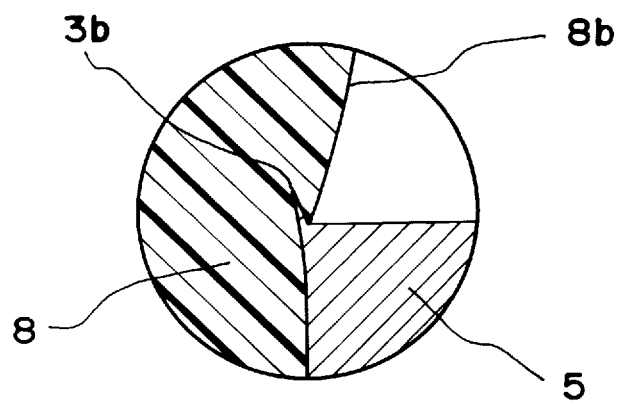
FIG. 5 is a enlarged view showing part A in FIG. 4.
Figure 6:
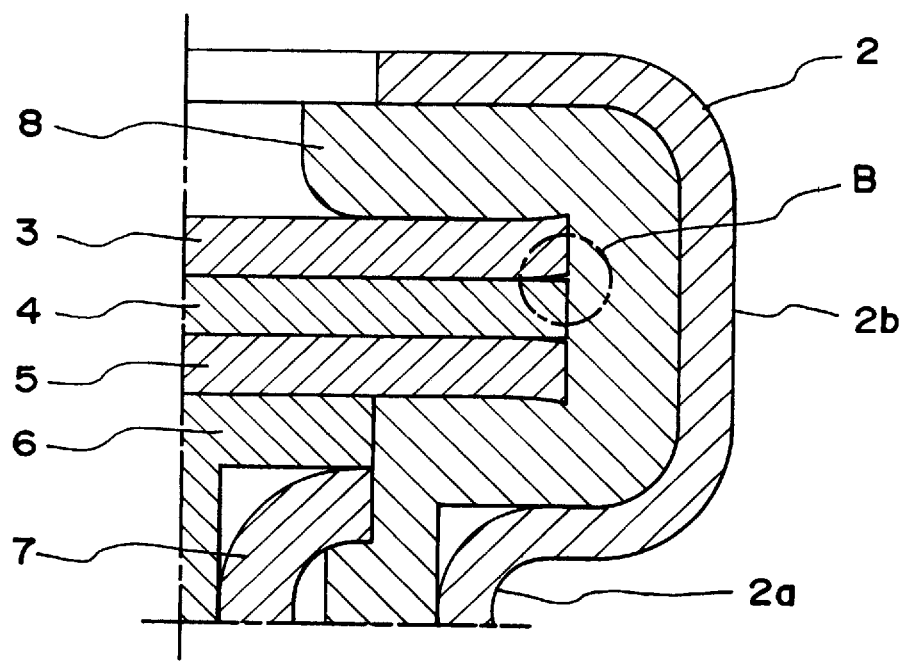
FIG. 6 is a fragmentary sectional view showing the battery sealing structure according to the invention.

The safety valve 5 and the cap member 3 are formed in a press process using a press means (not shown). As shown in FIG. 5, in the press process the safety valve 5 and the cap member 3 are formed such that they have slight burs 5c and 3b along their edge. The burs 5c and 3b are directed in the opposite direction to the direction of inserting the safety valve 5 and the cap member 3 into the gasket 8. It is thus possible to prevent damage from being caused to the gasket 8 by the burs 5c and 3b and to prevent detachment of the assembling parts once inserted in the gasket 8.

After the cap member 3, the PTC element 4, the safety valve 5, the insulating member 6 and the stripper member 7 have been assembled as the assembling parts in the battery housing 2, they are set in press dies (not shown) for sealing them by caulking. At this time, one of the dies enters the neck 2a of the battery housing 2 from the outer side, and cooperates with the other die which is lowered, such that the edges of the assembling parts are held in close contact with the gasket 8 in the battery housing 2. At this time, it is important to hold the battery housing 2, in which the cap member 3, the PTC element 4, the safety valve 5, the insulating member 6 and the stripper member 7 have been assembled as the assembling parts, so that the outer periphery wall 2b of the battery housing 2 will not be deformed outwardly by the force of the press.

Figure 7:
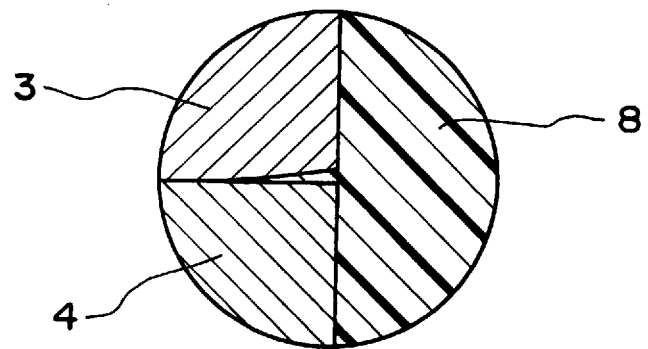
FIG. 7 is a enlarged view showing part B in FIG. 6.

As shown in FIG. 7, with such setting of the press dies the caulking of the battery 1 causes the gasket 8, formed of the soft synthetic resin, to enter slight clearances between the engagement surfaces of edges of the stacked cap member 3, PTC element 4 and safety valve 5 to a depth of 0.05 to 0.1 mm as the gasket 8 is compressed in the battery housing 2, thus perfectly sealing the cap member 3, PTC element 4 and safety valve 5 with respect to one another.

As has been described in the foregoing, in the battery sealing structure according to the invention, the three-part stack, which comprises the cap member as the outermost member of the battery, the PTC element located inwardly of the cap member and having a positive temperature coefficient of resistance, and a safety valve with breakable portions capable of being broken with an increase of the pressure in the battery, is inserted in the substantially cylindrical soft synthetic resin gasket and set on the stepped portion of the gasket such that its edge is in close contact with the inner periphery of the gasket. The cap member, the PTC element and the safety valve fitted in the gasket in close contact therewith, are not readily disassembled and can be loaded as assembling parts in the parts feeder, thus greatly contributing to an improvement in the battery assembling operation efficiency. In addition, a peripheral wall portion of the battery housing adjacent the opening thereof is bent together with the gasket toward the center of the battery and onto an edge portion of the upper surface of the cap member and pressed against the same while pushing a portion of the battery housing peripheral wall where the edges of the cap member and the safety valve are located with pushing means. In this way, the gasket is caused to enter clearances between engaged surfaces of edges of the cap member, the PTC element and the safety valve. The battery thus can be perfectly sealed with the sole gasket having an ideal engagement size for the caulking.

The safety valve has the concentric stepped portion, on which the substantially ring-like insulating member is fitted, and on which is in turn fitted the stripper member which is disposed in contact with the lead of the power-generating element in the battery. The stripper member is capable of being deformed to cut current between the safety valve and the lead when the pressure in the battery is increased. The safety valve, the insulating member and the stripper member are thus engaged in close contact with one another and not readily disassembled, so that they can be loaded as assembling parts in the parts feeder, thus greatly contributing to the output increase and step reduction of mass production of batteries in a consistent flow operation.

The cap member and the safety valve that are inserted may be formed in a press process such that they have burs formed around their edges and extending in the direction opposite to the direction of inserting them into the gasket. Thus, they can be inserted into the gasket without causing damage thereto with the burs, and once inserted, they can not be readily detached.

What is claimed is:

1. A battery sealing structure comprising:

a battery housing;

a cylindrical gasket insertable in an upper open end of said battery housing, said gasket being formed of a soft synthetic resin and including a step portion;

a three-part stack inserted in said gasket and supported on said step portion, said three-part stack including an outermost cap member, a positive temperature coefficient element, and a safety valve having breakable portions capable of being broken in the event of an increase of pressure in said battery housing, wherein said cap member and said safety valve include burs along their outer peripheral edge portions, said burs extend from said outer peripheral edge portions in a direction which is opposite to the direction of insertion of the three-part stack into said gasket such that said burs engage an inner peripheral surface of said gasket to prevent said cap member and said safety valve from being easily detached from said gasket following insertion thereof.

2. The battery sealing structure as claimed in claim 1, wherein said safety valve includes a concentric stepped portion, said sealing structure further comprising:

a ring-like insulating member fitted on said stepped portion of said safety valve;

a stripper member fitted on said insulating member, said stripper member being disposed for contacting a lead of a battery power-generating element, said stripper member being deformable to cut current between said safety valve and the lead when pressure in the battery increases beyond a predetermined level.

3. The battery sealing structure as claimed in claim 1, wherein said gasket is formed of polypropylene.

4. The battery sealing structure as claimed in claim 1, wherein said gasket is formed of polytetrafluoroethylene.

5. The battery sealing structure as claimed in claim 1, wherein said gasket includes a protuberance at an upper inner periphery of said gasket.

6. A battery sealing structure comprising:

a battery housing having an open upper end;

a cylindrical gasket inserted in said upper open end of said battery housing, said gasket being formed of a soft synthetic resin and including a step portion;

a safety valve inserted in said gasket and supported on said step portion, said safety valve having breakable portions capable of being broken in the event of an increase of pressure in a battery;

a positive temperature coefficient element inserted in said gasket and supported on an upper surface of said safety valve;

an outermost cap member inserted in said gasket and supported on an upper surface of said positive temperature coefficient element, said cap member and said safety valve being formed with burs along their outer peripheral edge portions, said burs extending in a direction which is opposite to the direction of insertion of said cap member and said safety valve into said gasket so that said burs engage an inner peripheral surface of said gasket so as to prevent said cap member and said safety valve from being easily detached from said gasket following insertion thereof, wherein an upper portion of said battery housing, adjacent said battery housing opening, is bent so as to press said gasket toward a central axis of said battery housing and into engagement with an upper surface of said cap member and into clearances between outer peripheral edges of said cap member, said positive temperature coefficient element, and said safety valve in order to seal a battery.

7. The battery as claimed in claim 6, further comprising:

a ring-like insulating member, wherein said safety valve includes a concentric stepped portion and said insulating member is fitted on said stepped portion of said safety valve; and a stripper member fitted on said insulating member, said stripper member being disposed for contacting a lead of a battery power-generating element, said stripper member being deformable for cutting current between said safety valve and the lead when pressure in the battery increases beyond a predetermined level.

8. The battery as claimed in claim 6, wherein said gasket is formed of polypropylene.

9. The battery as claimed in claim 6, wherein said gasket is formed of polytetrafluoroethylene.

10. The battery as claimed in claim 6, wherein said gasket includes an inwardly extending protuberance formed adjacent an upper end of said gasket.

\* \* \* \* \*